United States Patent
Saupe et al.

(10) Patent No.: US 11,635,019 B2
(45) Date of Patent: Apr. 25, 2023

(54) CONNECTING ROD FOR CHANGING A COMPRESSION RATIO OF AN INTERNAL COMBUSTION ENGINE

(71) Applicant: FEV Group GmbH, Aachen (DE)

(72) Inventors: Thomas Saupe, Aachen (DE); Christopher Marten, Aachen (DE); Denis Pendovski, Aachen (DE); Katharina Eichler, Aachen (DE)

(73) Assignee: FEV Group GmbH, Aachen (DE)

(*) Notice: Subject to any disclaimer, the term of this patent is extended or adjusted under 35 U.S.C. 154(b) by 0 days.

(21) Appl. No.: 17/237,378

(22) Filed: Apr. 22, 2021

(65) Prior Publication Data
US 2021/0332747 A1    Oct. 28, 2021

(30) Foreign Application Priority Data

Apr. 23, 2020 (DE) .......... 102020002457.2

(51) Int. Cl.
*F02B 75/04* (2006.01)
*F16C 7/02* (2006.01)
*F16C 7/06* (2006.01)

(52) U.S. Cl.
CPC .......... *F02B 75/045* (2013.01); *F16C 7/023* (2013.01); *F16C 7/06* (2013.01)

(58) Field of Classification Search
CPC ...... F02B 75/045; F02B 75/044; F02D 15/02; F16C 7/06; F16C 3/28; F16C 3/22; F16K 31/122; F16K 3/26; F16K 31/44; F16K 31/52
See application file for complete search history.

(56) References Cited

U.S. PATENT DOCUMENTS

| | | | | |
|---|---|---|---|---|
| 10,487,729 | B1* | 11/2019 | Choi | F16C 7/06 |
| 2002/0056340 | A1* | 5/2002 | Weiss | F02D 15/02 |
| | | | | 74/595 |
| 2017/0204784 | A1* | 7/2017 | O'Shea | F16C 7/06 |
| 2017/0241333 | A1* | 8/2017 | Roth | F02B 75/045 |
| 2018/0320732 | A1* | 11/2018 | Kim | F02D 15/02 |

(Continued)

FOREIGN PATENT DOCUMENTS

| CN | 107084046 A | * | 8/2017 |
|---|---|---|---|
| CN | 107529584 A | * | 1/2018 |

(Continued)

*Primary Examiner* — George C Jin
*Assistant Examiner* — Teuta B Holbrook
(74) *Attorney, Agent, or Firm* — Burris Law, PLLC

(57) ABSTRACT

A connecting rod for changing a compression ratio of an internal combustion engine includes a connecting rod head, a connecting rod pin, and an interlock. The connecting rod pin is supported by an eccentric of the connecting rod at a variable distance within the connecting rod head. The connecting rod head or the connecting rod pin includes a fluid chamber and the eccentric has a projection extending into the fluid chamber. In the alternative, the eccentric delimits a fluid chamber and the connecting rod head or the eccentric has a projection extending into in the fluid chamber. A fluid pressure in the fluid chamber exerts a force on the projection to change the position of the eccentric. In a locking position, the interlock inhibits rotation of the eccentric relative to the connecting rod head and the interlock is configured to be releasable.

20 Claims, 6 Drawing Sheets

(56) References Cited

U.S. PATENT DOCUMENTS

Figure 1:
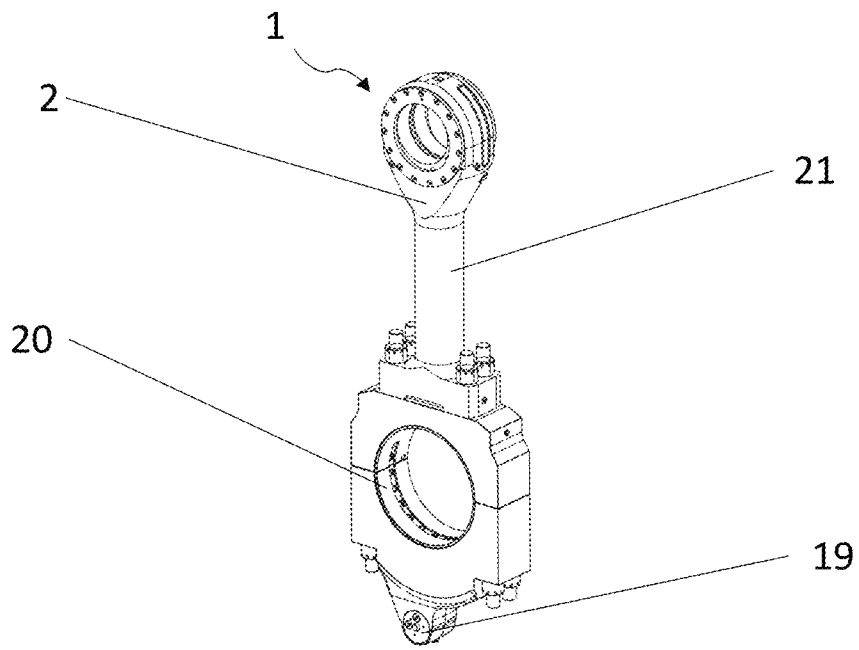

2018/0328275 A1* 11/2018 Schaffrath ................. F16C 9/04
2020/0116080 A1*  4/2020 Choi ....................... F15B 15/06

FOREIGN PATENT DOCUMENTS

| | | | | | |
|---|---|---|---|---|---|
| CN | 108798890 | A | * | 11/2018 | ............ F02B 75/045 |
| CN | 109578138 | A | * | 4/2019 | ............. F02B 75/04 |
| CN | 109578138 | A | * | 4/2019 | |
| DE | 10304686 | A1 | * | 8/2004 | ............ F02B 75/045 |
| DE | 102005019809 | A1 | * | 11/2006 | ............ F02B 75/045 |
| DE | 102016113646 | A1 | * | 1/2018 | ............ F02B 75/045 |
| DE | 102017107682 | A1 | * | 2/2018 | |
| DE | 102017102156 | B4 | * | 12/2019 | ............ F02B 75/045 |
| JP | H063165 | Y2 | * | 1/1994 | |
| JP | H06129272 | A | * | 5/1994 | |
| JP | H082441 | Y2 | * | 1/1996 | |
| JP | H0826790 | B2 | * | 3/1996 | |
| JP | H0826794 | B2 | * | 3/1996 | |
| JP | 2015124639 | A | * | 7/2015 | |
| JP | 2016056719 | A | * | 4/2016 | |
| WO | WO-2010108582 | A1 | * | 9/2010 | ............ F02B 75/045 |
| WO | WO-2016014312 | A1 | * | 1/2016 | ............ F02B 75/045 |
| WO | WO-2018188790 | A1 | * | 10/2018 | ............ F02B 75/045 |

\* cited by examiner

CONNECTING ROD FOR CHANGING A COMPRESSION RATIO OF AN INTERNAL COMBUSTION ENGINE

CROSS-REFERENCE TO RELATED APPLICATIONS

This application claims priority to and the benefit of German Patent Application No. 102020002457.2 filed on Apr. 23, 2020. The disclosure of the above application is incorporated herein by reference.

FIELD

The present disclosure relates to a connecting rod for changing a compression ratio of an internal combustion engine.

BACKGROUND

The statements in this section merely provide background information related to the present disclosure and may not constitute prior art.

A connecting rod with a device for changing a compression ratio of an internal combustion engine is known from DE102019103998A1, wherein a releasable interlock is being provided in at least one switching position.

SUMMARY

This section provides a general summary of the disclosure and is not a comprehensive disclosure of its full scope or all of its features.

In one form of the present disclosure, a connecting rod with a device for changing a compression ratio of an internal combustion engine comprises a connecting rod head, a connecting rod pin and an interlock. The connecting rod pin is supported by an eccentric of the connecting rod with a variable distance from the connecting rod head. Either the connecting rod head or the connecting rod pin comprises a fluid chamber and the eccentric has a projection extending into the fluid chamber, and/or the eccentric comprises or delimits a fluid chamber and the connecting rod head or the eccentric has a projection extending into the fluid chamber, such that a fluid pressure in the fluid chamber exerts a force on the projection to change the position of the eccentric. In a locking position, the interlock inhibits or prevents the eccentric from rotating relative to the connecting rod head. The interlock is designed to be releasable. The connecting rod comprises a hydraulic circuit with a first sub-circuit for controlling the fluid chamber and a second sub-circuit, which is decoupled from the first sub-circuit, for controlling the interlock.

By decoupling the second sub-circuit from the first sub-circuit, the teachings of the present disclosure enable the interlock to be securely locked. Without a decoupling of the first and the second sub-circuit, significant amounts of air could be trapped in the second sub-circuit, which might cause an unintentional unlocking of the interlock.

In some variations of the present disclosure, a hydraulic resistance is provided for decoupling the first and the second sub-circuit. For example, the first and/or the second sub-circuit includes an orifice plate or a throttle.

In at least one variation, the interlock comprises two locking pins and a receptacle, such that a first locking pin engages in the receptacle in a first position of the eccentric and a second locking pin engages in the receptacle in a second position. As a result, the teachings of the present disclosure enable a high and a low compression ratio to be set reliably.

In some variations, the interlock comprises a spring for locking. In at least one variation, the interlock is connected to the hydraulic circuit for unlocking, such that a pressure of a hydraulic fluid counteracts a force of the spring and unlocks the interlock. In order to avoid or at least reduce undesired dynamics in the hydraulic circuit, the interlock comprises a vent such that air can escape from the second sub-circuit. In some variations, to lock the interlock, the connection between the interlock and the hydraulic circuit is inhibited (e.g., prevented) such that the hydraulic fluid can drain, the pressure of the hydraulic fluid drops and the spring can lock the interlock again.

In at least one variation, the connecting rod head comprises two fluid chambers and the eccentric two projections extending into the fluid chambers, such that the connecting rod comprises four hydraulic chambers. One hydraulic chamber of each fluid chamber is in an expanded state when a high compression ratio is set. The other hydraulic chamber of each fluid chamber is in an expanded state when a low compression ratio is set.

In some variations, the first sub-circuit comprises at least one purge line, such that a continuous supply of hydraulic fluid to the fluid chambers can be provided and an entrapment of significant amounts of air can be avoided or at least reduced.

In some variations of the present disclosure, the hydraulic circuit comprises a switching valve which is designed as a directional control valve with 2 switching positions and 7 ports. Because the switching valve is designed as a 7/2 directional control valve, the present disclosure enables the decoupling between the first and second sub-circuits in a compact design. Due to the compact design, the hydraulic circuit can be integrated in the connecting rod in a maintenance-friendly manner.

The switching valve is designed to initiate a switching process from a high to a low compression ratio or from a low to a high compression ratio by changing the switching position. At the same time, the switching process controls the locking and unlocking of the interlock.

The dependent claims describe further advantageous forms or variations of the present disclosure.

Further areas of applicability will become apparent from the description provided herein. It should be understood that the description and specific examples are intended for purposes of illustration only and are not intended to limit the scope of the present disclosure.

DRAWINGS

Figure 2:
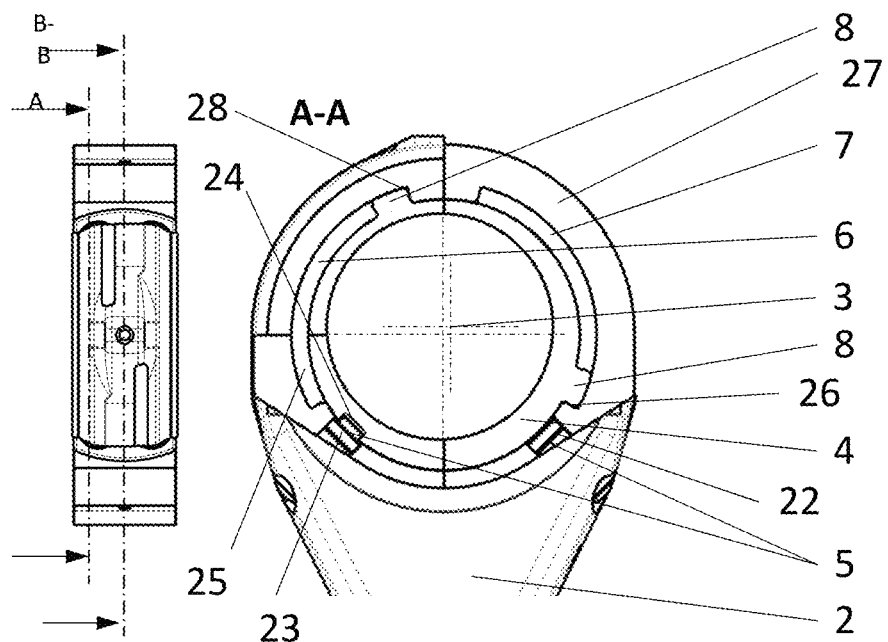
Figure 3:
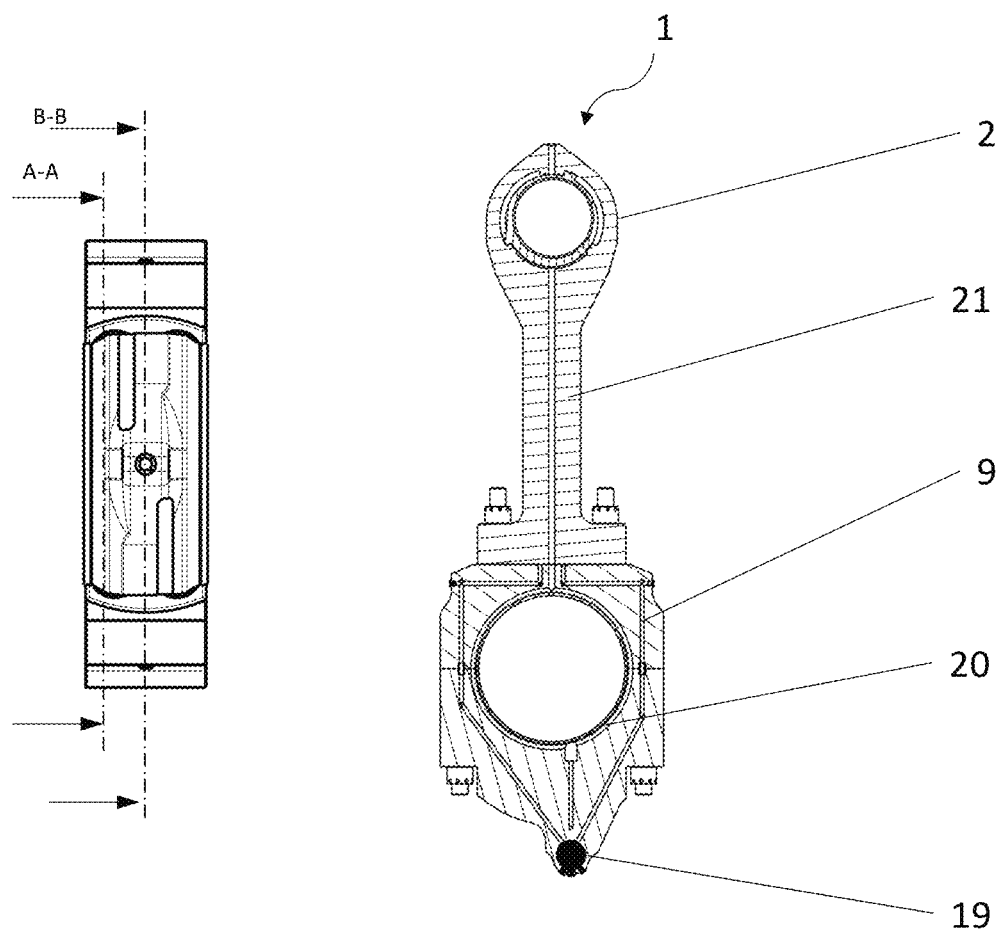
Figure 4:
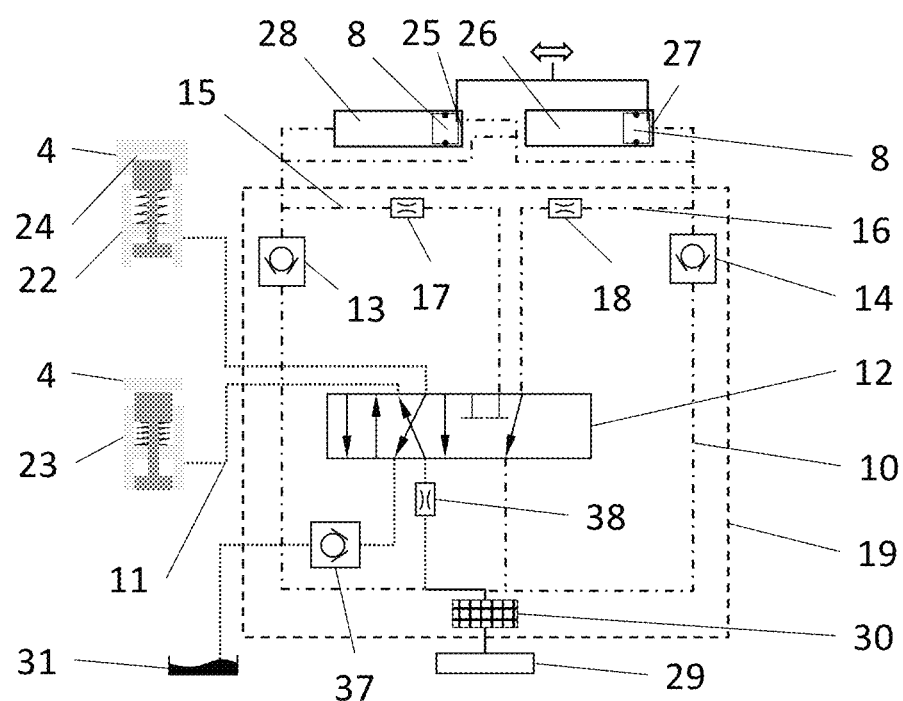
Figure 5:
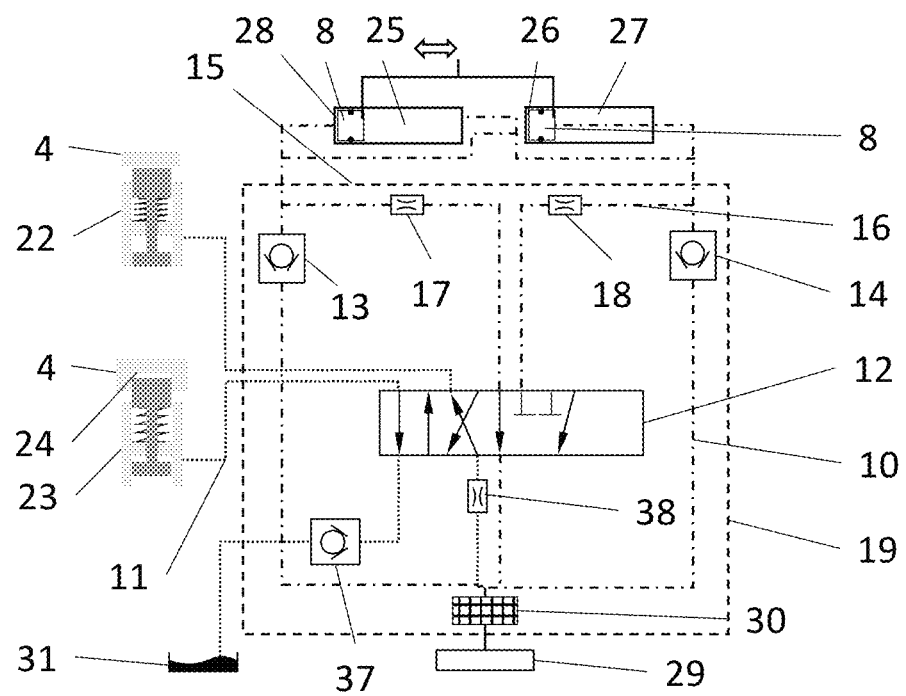
Figure 6:
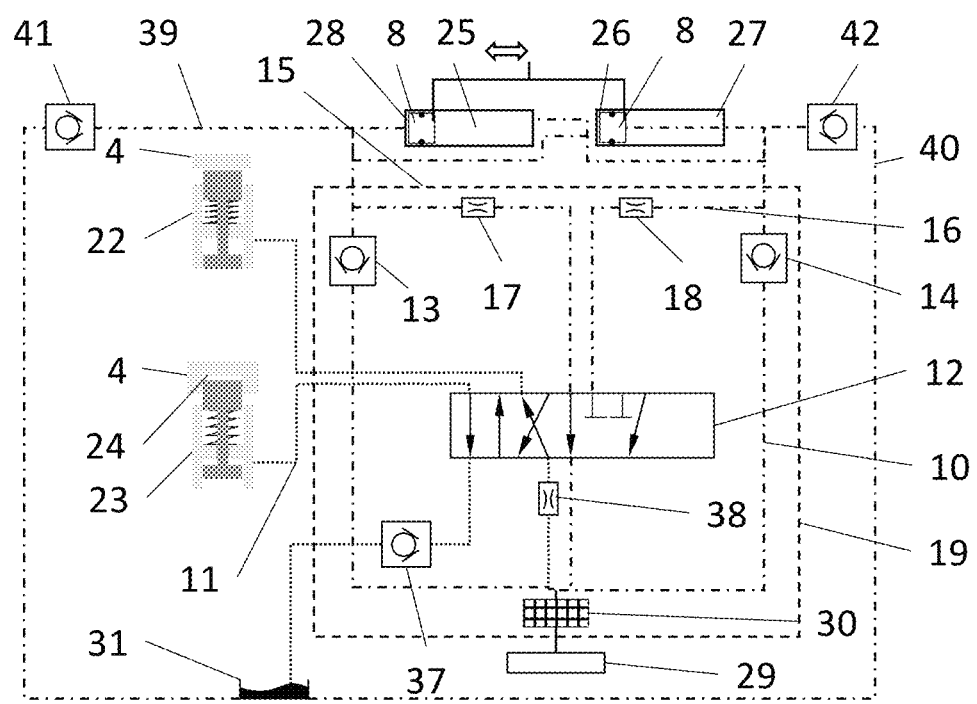
Figure 7:
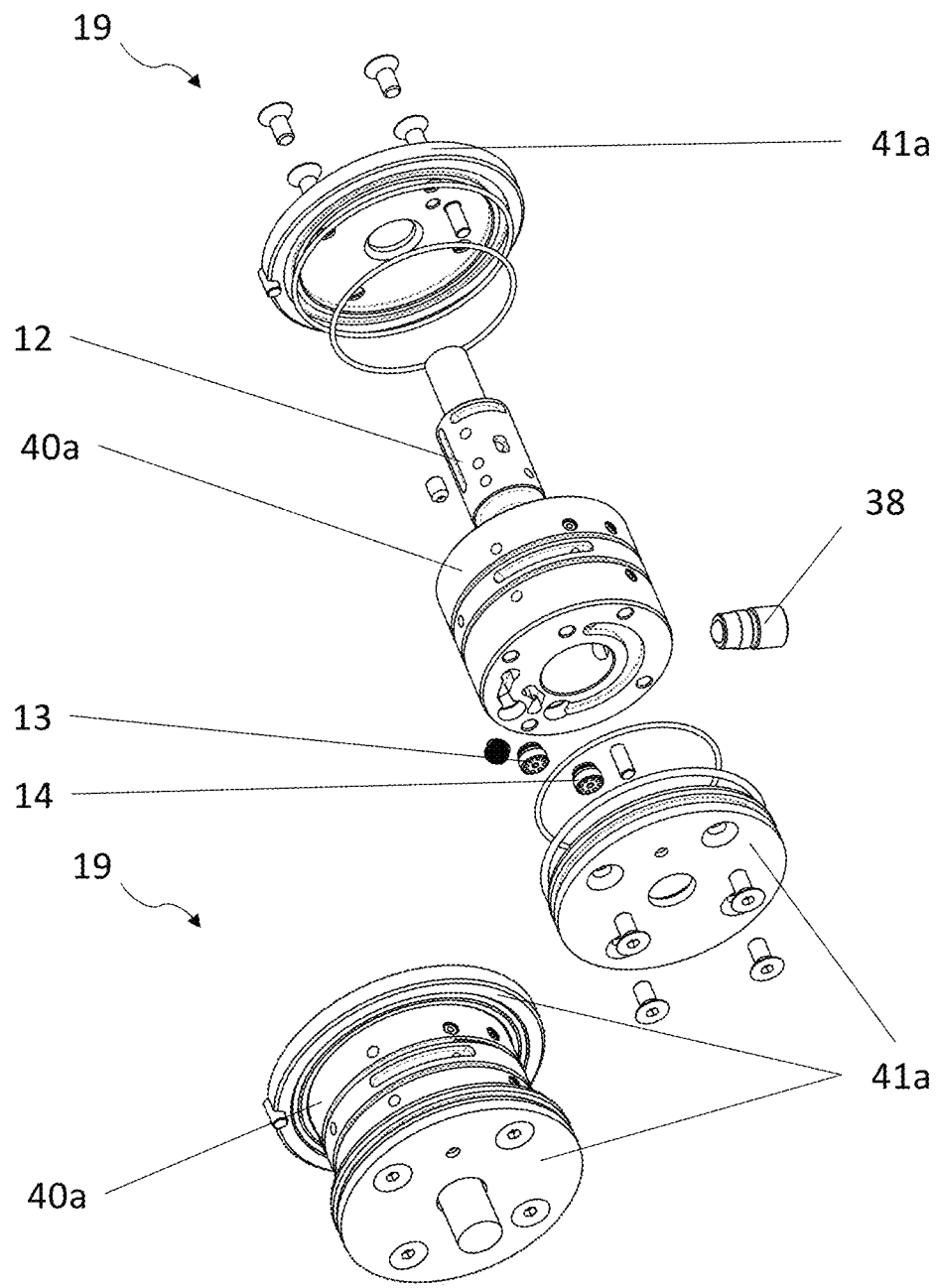

In order that the disclosure may be well understood, there will now be described various forms thereof, given by way of example, reference being made to the accompanying drawings, in which:

FIG. 1 shows a form of a connecting rod with a device for changing a compression ratio of an internal combustion engine, FIG. 2 shows a sectional view of a form of a connecting rod with a device for changing a compression ratio of an internal combustion engine, FIG. 3 shows a further sectional view of a form of a connecting rod with a device for changing a compression ratio of an internal combustion engine, FIG. 4 shows a form of a hydraulic circuit of a connecting rod with a device for changing a compression ratio of an internal combustion engine, FIG. 5 shows an alternative form of a hydraulic circuit of a connecting rod with a device for changing a compression ratio of an internal combustion engine, FIG. 6 shows an alternative form of a hydraulic circuit of a connecting rod with a device for changing a compression ratio of an internal combustion engine, and FIG. 7 shows an exploded view and an assembled view of a hydraulic switchover module of a connecting rod with a device for changing a compression ratio of an internal combustion engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a connecting rod 1 with a device for changing a compression ratio of an internal combustion engine. The connecting rod 1 comprises a connecting rod head 2, a connecting rod shaft 21 and a large connecting rod eye 20. A hydraulic switchover module 19 is arranged below the large connecting rod eye 20.

FIG. 2 shows a sectional view of the connecting rod 1. The connecting rod comprises a connecting rod pin 3, which is supported by an eccentric 4 of the connecting rod 1 at a variable distance from the connecting rod head 2.

During operation of the internal combustion engine, the connecting rod 1 is exposed to alternating tensile and compressive forces with each revolution of the engine. The compressive forces result from a combustion pressure, the tensile forces from inertia forces during a reversing movement of a piston to which the connecting rod 1 is connected by the connecting rod pin 3. The compressive forces cause a counterclockwise torque on the eccentric 4 with the tendency to adjust the eccentric 4 in the direction of a low compression ratio, the tensile forces cause a clockwise torque with the tendency to adjust the eccentric 4 in the direction of a high compression ratio.

The connecting rod head 2 comprises two fluid chambers 6, 7 and the eccentric 4 has two projections 8. A projection 8 extends into each of the two fluid chambers 6, 7, such that a fluid pressure in the fluid chambers 6, 7 exerts a force on the projection 8 to change the eccentric position of the eccentric 4. Each fluid chamber 6, 7 is divided into two hydraulic chambers 25, 26, 27, 28 by the two projections 8.

The hydraulic chambers 25, 27 expand during an adjustment of the connecting rod 1 in the direction of a low compression ratio. During an adjustment in the direction of a high compression ratio, the hydraulic chambers 25, 27 compress. The hydraulic chambers 26, 28 expand during an adjustment of the connecting rod 1 in the direction of a high compression ratio and compress during an adjustment in the direction of a small compression ratio.

The connecting rod 1 comprises two interlocks 5 which, in a locking position, inhibit (e.g., prevent) the eccentric 4 from rotating relative to the connecting rod head 2. The interlocks 5 are releasable and each includes a locking pin 22, 23 which can be engaged in a receptacle 24. The locking pin 22 locks the eccentric 4 in the position of a high compression ratio by engaging in the receptacle 24, the locking pin 23 locks the eccentric 4 in the position of a low compression ratio by engaging in the receptacle 24.

FIG. 3 shows the connecting rod 1 in a further sectional view. The connecting rod 1 comprises a hydraulic circuit 9. The hydraulic circuit comprises an oil and is designed to supply the hydraulic chambers 25, 26, 27, 28 and the locking pins 22, 23 with oil in such a way that the eccentric 4 is brought into and locked in a desired position of a low or high compression ratio.

FIG. 4 shows a schematic representation of the hydraulic circuit 9 with a first 10 (dash-dotted lines) and a second 11 (dotted lines) sub-circuit. The hydraulic chambers 25, 26, 27, 28 are supplied with oil via the first sub-circuit 10. The locking pins 22, 23 are supplied with oil via the second sub-circuit 11. The hydraulic circuit 9 is designed to be controllable by a switching valve 12. The switching valve is designed as a directional control valve with 2 switching positions and 7 ports.

The oil in the hydraulic circuit 9 is fed from a connecting rod bearing 29 and cleaned by a filter unit 30. Part of the oil feeds the first sub-circuit 10, another part the second 11 sub-circuit.

Here, the connecting rod 1 is in the position of a high compression ratio. The hydraulic chambers 26, 28 have a maximum volume and are connected to the hydraulic circuit 9 for the oil supply. The hydraulic chambers 26, 28 are completely filled with oil. Possible system leaks can flow unhindered from the connecting rod bearing 29 via the first sub-circuit 10 into the hydraulic chambers 26, 28.

At the same time, the hydraulic chambers 25, 27 with a minimal chamber volume are supplied with oil, starting from the connecting rod bearing 29 via the first sub-circuit 10. This part of the first sub-circuit 10 experiences a continuous purging effect via a purge line 16, such that emptying of the pipelines is counteracted and during a switching process it is avoided that significant amounts of air are trapped in the first sub-circuit 10 and the switching process has inadmissibly high dynamics. The purge line 16 comprises a hydraulic resistor 18 designed as an orifice plate in order to set an advantageous pressure in the hydraulic chambers 25, 27.

At the same time, there is a permanent oil supply to the locking pin 23 via the second sub-circuit 11, which leads to the locking pin 23 being unlocked. The locking pin 22, on the other hand, is separated from the oil supply such that resetting by a spring force is enabled and no undesired pressure-dynamic effects caused by inertia forces acting on the oil during engine operation cause the locking pin 22 to be unlocked. By disconnecting the locking pin 22 from the oil supply, the oil can drain from the corresponding pipelines into an oil pan 31. A check valve 37 is arranged in the line between the switching valve 12 and the oil pan 31 for regulation and to inhibit or prevent backflow.

The desired pipeline system of the hydraulic circuit 9 is integrated into the connecting rod base body, that is to say into the connecting rod shaft 21 and bearing caps (not shown), and is connected to the hydraulic switchover module 19. The hydraulic switchover module 19 comprises the switching valve 12, the filter unit 30, the purge line 16, the orifice plate 18, the check valve 37 and sections of the first 10 and second 11 sub-circuits, in particular the sections relevant for the switching.

When the switching valve 12 is brought into a position for a low compression ratio, the locking pin 23 is first connected to the second sub-circuit 11. A pressure build-up takes place within the corresponding pipeline system, which leads to the unlocking of the locking pin 23. Defined venting enables air in the locking pin 23 to escape.

At the same time, the amount of oil from the supply lines of the locking pin 22 is diverted, which leads to resetting by spring force and thus to locking. Geometrically, however, the locking pin 22 is inhibited (e.g., prevented) from engaging, since it cannot engage in the receptacle 24 of the eccentric 4. As a result, rotational movement of the eccentric 4 is enabled and the switching process in the direction of a low compression ratio is initiated.

In this case, oil is displaced from the hydraulic chambers 26, 28 during the prevailing compression force phases and flows into the chambers 25, 27 via the hydraulic switchover module 19. In the meantime, the fluid passes through a hydraulic resistance 17 designed as an orifice plate in the purge line 15. This enables a damping effect on the rotation process of the eccentric 4. A check valve 14 and the switching valve 12 are designed as backstops in order to be able to hold the eccentric 4 in its position during the tensile force phases. The process is repeated until after a few cycles the end position of a low compression ratio is reached. For a switchover from a low to a high compression ratio, the process proceeds analogously; a check valve 13 is then designed and configured as a hydraulic backstop to hold the eccentric 4 in its position during the compressive force phases.

FIG. 5 shows the connecting rod 1 in the position of a low compression ratio. The locking pin 23 engages in the corresponding receptacle 24. In order to inhibit (e.g., prevent) unintentional unlocking, the oil in the pipelines to the locking pin 23 is reduced so that no pressure increases due to inertia occur. This could cause an unwanted unlocking process. The orifice plate 17 is therefore dimensioned such that the duration of the switching process is adapted to the reduction process of the oil in the pipelines to the locking pin 23. Similarly, the orifice plate 18 is dimensioned such that when switching from a low to a high compression ratio, the duration of the switching process is adapted to the reduction process of the oil in the pipelines to the locking pin 22.

FIG. 6 shows an alternative form of the connecting rod 1 in the position of a low compression ratio. The first sub-circuit 10 comprises a first pressure relief line 39 and a second pressure relief line 40 with a first hydraulic resistor 41 and a second hydraulic resistor 42. The first pressure relief line 39 is designed to connect the hydraulic chambers 26, 28 to the oil pan 31. The second pressure relief line 40 is designed to connect the hydraulic chambers 25, 27 to the oil pan 31. To regulate the pressure in the hydraulic chambers 25, 26, 27, 28, the first hydraulic resistor 41 and the second hydraulic resistor 42 are designed as pressure relief valves. The first pressure relief line 39 and the second pressure relief line 40 enable pressure regulation in the hydraulic chambers 25, 26, 27, 28. For the position of the connecting rod 1 in a low compression ratio as shown in FIG. 6, an overpressure in the hydraulic chambers 25, 27 is avoided or can at least be reduced.

In further exemplary forms, not shown here, two locking pins are used for locking in one or both positions of the eccentric 4. In a further exemplary form, both locking pins 22, 23 are designed to be locked in one position of the eccentric 4. In the second position of the eccentric 4, no locking is performed.

FIG. 7 shows a form of the hydraulic switchover module 19 comprising a cartridge 40, two covers 41 with screw connection, the switching valve 12, the check valves 13, 14 and an orifice plate 38 for decoupling the first sub-circuit 10 from the second 11 sub-circuit. In some forms of the present disclosure, the locking of the switching valve 12 within the cartridge 40 is done mechanically by a locking ball. In alternative exemplary forms, the cartridge 40 and the switching valve 12 are improved using additive manufacturing processes in order to reduce flow losses.

In some variations, the hydraulic switchover module 19 is integrated within the large connecting rod eye 20. In alternative exemplary variations, the hydraulic switchover module 19 is accommodated in the connecting rod shaft 21 in order to be able to meet special installation space requirements.

In some variations, the switching valve 12 is operated mechanically. In alternative exemplary variations, the switching valve 12 is designed and configured to be hydraulically or electromagnetically actuatable.

The switching axis of the switching valve 12 is arranged here parallel to a crankshaft axis of the internal combustion engine in order to reduce the influence of acceleration forces on the switching axis. The orientation of the check valves 13, 14, 37 is in the direction of the axis of the crankshaft in order to counteract inertia effects during the valve opening and/or closing.

In alternative exemplary forms, instead of the check valve 37, a pressure relief bore or a pressure relief valve is provided in order to control the oil pressure in the locking pin 22, 23, which is separate from the hydraulic circuit.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A connecting rod with a device for changing a compression ratio of an internal combustion engine, the connecting rod comprising:
   a connecting rod head and a connecting rod pin supported by an eccentric of the connecting rod at a variable distance from the connecting rod head, and
   an interlock, wherein
   a fluid chamber is defined inside the connecting rod head and contains a hydraulic fluid, the eccentric having a projection extending into the fluid chamber and in contact with the hydraulic fluid such that a fluid pressure of the hydraulic fluid in the fluid chamber exerts a force on the projection to change a position of the eccentric; and
   wherein in a locking position, the interlock inhibits rotation of the eccentric relative to the connecting rod head, the interlock is configured to be releasable, and the connecting rod comprises a hydraulic circuit in fluid communication with the fluid chamber and including a first sub-circuit for controlling the fluid pressure of the hydraulic fluid in the fluid chamber and a second sub-circuit de-coupled from the first sub-circuit for controlling the interlock.

2. The connecting rod according to claim 1, wherein the hydraulic circuit comprises a switching valve configured as a directional control valve with switching positions and ports.

3. The connecting rod according to claim 2, wherein the switching valve is actuated mechanically, hydraulically or electromagnetically.

4. The connecting rod according to claim 1, wherein the hydraulic circuit comprises a hydraulic backstop.

5. The connecting rod according to claim 1, wherein the first sub-circuit comprises a purge line for purging the fluid chamber.

6. The connecting rod according to claim 5, wherein the purge line comprises a hydraulic resistor.

7. The connecting rod according to claim 1, wherein the connecting rod comprises a hydraulic switchover module and wherein the hydraulic switchover module comprises a cartridge and a section of the hydraulic circuit with a switching valve and a hydraulic backstop.

8. The connecting rod according to claim 7, wherein the hydraulic switchover module is arranged in a large connecting rod eye or a shaft of the connecting rod.

9. The connecting rod according to claim 1, wherein the inter-lock comprises a locking pin which is designed to engage in a receptacle.

10. The connecting rod according to claim 1, wherein the first sub-circuit comprises a pressure relief line with a hydraulic resistance.

11. The connecting rod according to claim 1, wherein the inter-lock comprises a locking pin which is designed to engage in a receptacle.

12. The connecting rod according to claim 1, wherein the switching valve is actuated mechanically, hydraulically or electromagnetically.

13. A connecting rod with a device for changing a compression ratio of an internal combustion engine, the connecting rod comprising:
    a connecting rod head and a connecting rod pin supported by an eccentric of the connecting rod at a variable distance from the connecting rod head, and an interlock, wherein
    a fluid chamber is defined inside the connecting rod head and contains a hydraulic fluid, the eccentric having a projection extending into the fluid chamber and in contact with the hydraulic fluid such that a fluid pressure of the hydraulic fluid in the fluid chamber exerts a force on the projection to change a position of the eccentric; and
    a hydraulic circuit in fluid communication with the fluid chamber and including a first sub-circuit for controlling the fluid pressure of the hydraulic fluid in the fluid chamber, a second sub-circuit de-coupled from the first sub-circuit for controlling the interlock, and a switching valve configured as a directional control valve with switching positions and ports, wherein in a locking position, the interlock inhibits rotation of the eccentric relative to the connecting rod head, and the interlock is configured to be releasable.

14. The connecting rod according to claim 13, wherein the hydraulic circuit comprises a hydraulic backstop.

15. The connecting rod according to claim 13, wherein the first sub-circuit comprises a purge line for purging the fluid chamber.

16. The connecting rod according to claim 15, wherein the purge line comprises a hydraulic resistor.

17. The connecting rod according to claim 13, wherein the connecting rod comprises a hydraulic switchover module and wherein the hydraulic switchover module comprises a cartridge and a section of the hydraulic circuit with a switching valve and a hydraulic backstop.

18. The connecting rod according to claim 17, wherein the hydraulic switchover module is arranged in a large connecting rod eye or a shaft of the connecting rod.

19. A connecting rod with a device for changing a compression ratio of an internal combustion engine, the connecting rod comprising:
    a connecting rod head and a connecting rod pin supported by an eccentric of the connecting rod at a variable distance from the connecting rod head, and an interlock, wherein
    a fluid chamber is defined inside the connecting rod head and contains a hydraulic fluid, the eccentric having a projection extending into the fluid chamber and in contact with the hydraulic fluid such that a fluid pressure of the hydraulic fluid in the fluid chamber exerts a force on the projection to change a position of the eccentric; and
    a hydraulic circuit in fluid communication with the fluid chamber and including a first sub-circuit for controlling the fluid pressure of the hydraulic fluid in the fluid chamber, a second sub-circuit de-coupled from the first sub-circuit for controlling the interlock, a switching valve configured as a directional control valve with switching positions and ports, and a hydraulic backstop, wherein in a locking position, the interlock inhibits rotation of the eccentric relative to the connecting rod head, the interlock is configured to be releasable, and the switching valve is actuated mechanically, hydraulically or electromagnetically.

20. The connecting rod according to claim 19 further comprising a hydraulic switchover module with a cartridge and a section of the hydraulic circuit with the switching valve and the hydraulic backstop.

* * * * *